United States Patent [19]

Goto et al.

[11] 4,395,994
[45] Aug. 2, 1983

[54] FUEL MIXTURE HEATING DEVICE OF AN INTERNAL COMBUSTION ENGINE

[75] Inventors: Shuji Goto; Kazuyoshi Tasaka; Masaru Tanaka, all of Toyota, Japan

[73] Assignee: Toyota Jidosha Kogyo Kabushiki Kaisha, Aichi, Japan

[21] Appl. No.: 200,098

[22] Filed: Oct. 23, 1980

[30] Foreign Application Priority Data

Oct. 30, 1979 [JP] Japan .................. 54-149474[U]

[51] Int. Cl.³ .......................................... F02M 31/00
[52] U.S. Cl. .................................. 123/549; 261/142; 219/206
[58] Field of Search .................. 123/549, 552, 545; 306 219/205, 206, 207, 306, 307, 348; 261/142

[56] References Cited

U.S. PATENT DOCUMENTS

| | | | |
|---|---|---|---|
| 1,096,989 | 5/1914 | Bentley | 123/549 |
| 1,426,187 | 8/1922 | Harrison | 219/205 |
| 1,466,406 | 8/1923 | MacDonald | 219/207 |
| 1,472,233 | 10/1923 | Taylor | 219/205 |
| 2,700,722 | 1/1955 | Gurley | 261/142 |
| 3,892,215 | 7/1975 | Hickling | 219/206 |
| 4,108,125 | 8/1978 | Marcoux | 123/552 |
| 4,108,953 | 8/1978 | Rocco | 123/545 |
| 4,242,999 | 1/1981 | Hoser | 123/548 |
| 4,246,880 | 1/1981 | Henke | 123/549 |
| 4,300,513 | 11/1981 | Ray | 123/545 |
| 4,308,845 | 1/1982 | Sarto | 123/549 |

FOREIGN PATENT DOCUMENTS

| | | | |
|---|---|---|---|
| 475676 | 6/1915 | France | 219/207 |
| 828061 | 5/1938 | France | 123/545 |

Primary Examiner—Ronald H. Lazarus
Attorney, Agent, or Firm—Parkhurst & Oliff

[57] ABSTRACT

A fuel mixture heating device of an internal combustion engine having a downdraft type carburetor mounted on the collecting portion of the intake manifold. A hollow cylindrical heater vessel is arranged at the lower end of the air horn of the carburetor. The heater vessel comprises an inner pipe, an outer pipe and PTC elements inserted between the inner pipe and the outer pipe for heating the inner pipe before the completion of warm-up of the engine. The inner pipe, having an inner diameter which is almost the same as that of the air horn, is arranged to be aligned with the air horn. The outer pipe is made of a heat insulating material.

10 Claims, 5 Drawing Figures

FUEL MIXTURE HEATING DEVICE OF AN INTERNAL COMBUSTION ENGINE

DESCRIPTION OF THE INVENTION

The present invention relates to a fuel mixture heating device of an internal combustion engine.

Since the temperature of an engine is normally low before the completion of warm-up of the engine, the vaporization of the fuel fed from the carburetor is not fully effected. As a result of this, since a large amount of the fuel is fed into the cylinder of the engine in the form of liquid fuel, good combustion cannot be obtained and, therefore, a problem occurs in that it is difficult to ensure a stable combustion in the engine. Consequently, in a conventional engine, in order to ensure a stable combustion, a mixture, which is richer than the mixture fed into the cylinder after the completion of warm-up of the engine, is normally fed into the cylinder before the completion of warm-up of the engine. However, in the case wherein such a richer mixture is fed into the cylinder as in a conventional engine, problems occur in that the amount of harmful HC and CO components in the exhaust gas is increased and, in addition, specific fuel consumption of the engine is increased. Nevertheless, if it is possible to fully promote the vaporization of the mixture fed into the cylinder before the completion of the warm-up of the engine, it is possible to obtain a stable-combustion even if the air-fuel ratio of the mixture fed into the cylinder is increased. In addition, since it is possible to increase the air-fuel ratio of the mixture fed into the cylinder, the amount of harmful HC and CO components in the exhaust gas can be reduced and, also, specific fuel consumption can be improved. In order to promote the vaporization of the fuel before the completion of warm-up of the engine, a fuel vaporization promoting device has been known, in which the riser portion of the intake manifold is heated by the exhaust gas which is introduced to the riser portion from the exhaust system of the engine. However, in such a conventional fuel vaporization promoting device, in which the heat of the exhaust gas is used for promoting the vaporization of the fuel, there is a disadvantage in that it is difficult to promote the vaporization of the fuel immediately after the engine is started, because the temperature of the exhaust gas is not instantaneously increased after the engine is started. In order to eliminate the above disadvantage, a fuel vaporization promoting device has been proposed, in which a Positive Temperature Coefficient Thermister element (hereinafter referred to as a PTC element) having a homeycomb construction is inserted between the intake manifold and the carburetor for heating the entire mixture flowing into the intake manifold from the carburetor. However, a large part of the mixture fed from the carburetor flows on the inner wall of the air horn of the carburetor in the form of liquid fuel and, therefore, in order to promote the vaporization of the fuel fed from the carburetor, it is necessary to concentrically heat the liquid fuel flowing along the inner wall of the air horn of the carburetor. Nevertheless, in this fuel vaporization promoting device, only a small part of the heat issued from the PTC element is used for heating the liquid fuel, while the remaining large part of the heat issued from the PTC element is used for heating air. Consequently, in this fuel vaporization promoting device, a satisfactory vaporization of the liquid fuel cannot be obtained and, in addition, since air is positively heated, a problem occurs in that volumetric efficiency is reduced.

An object of the present invention is to provide a fuel mixture heating device of an internal combustion engine, which is capable of fully promoting the vaporization of liquid fuel in such a way that a large part of the heat issued from the heat source is used for heating the liquid fuel.

According to the present invention, there is provided a fuel mixture heating device of an internal combustion engine having an intake manifold and an intake passage which has an outlet connected to a collecting portion of the intake manifold, the intake passage having a fuel feed apparatus for feeding fuel into the intake passage, said device comprising: a power source, and; a hollow cylindrical heater vessel arranged at the outlet of the intake passage and having an outlet portion which projects into the collecting portion of the intake manifold, said heater vessel comprising a hollow cylindrical inner pipe, a hollow cylindrical outer pipe made of a heat insulating material, and a heater element connected to said power source and inserted between said inner pipe and said outer pipe, said inner pipe arranged to be aligned with the intake passage and having an inner diameter which is almost the same as that of the intake passage.

The present invention may be more fully understood from the description of preferred embodiments of the invention set forth below, together with the accompanying drawings.

DESCRIPTION OF PREFERRED EMBODIMENTS

Figure 1:
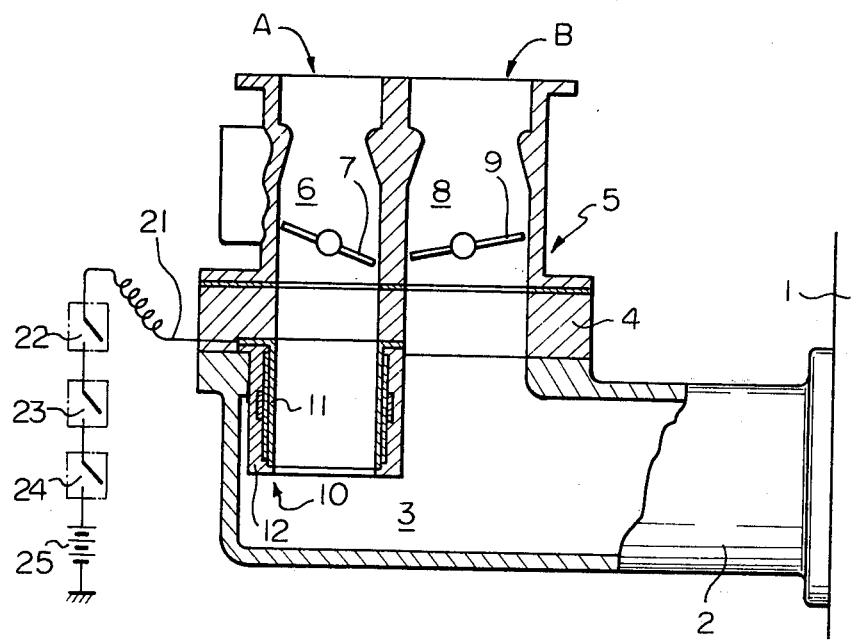
FIG. 1 is a cross-sectional side view of an intake system of an engine, illustrating an embodiment of a fuel mixture heating device according to the present invention.
Figure 2:
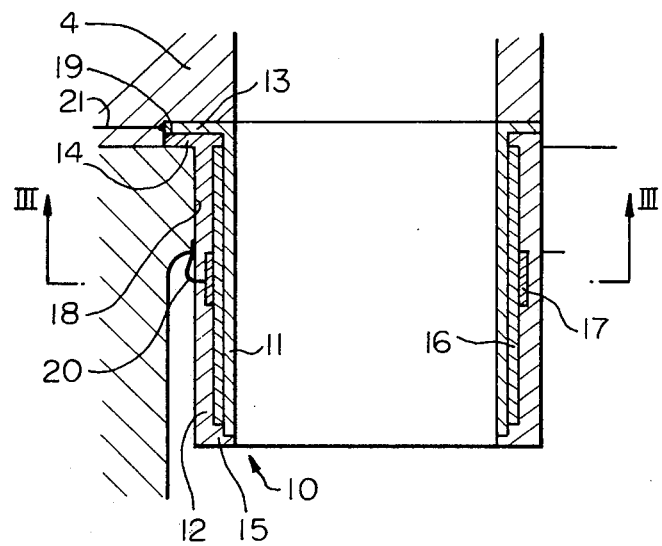
FIG. 2 is an enlarged cross-sectional view of a portion of the intake system illustrated in FIG. 1, taken along the line II—II in FIG. 3.
Figure 3:
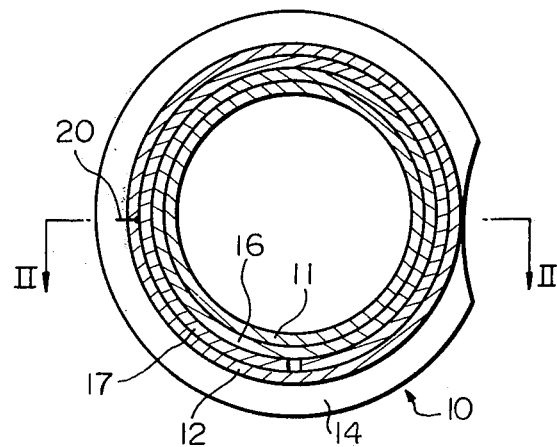
FIG. 3 is a corss-sectional view taken along the line III—III in FIG. 2.

Referring to FIG. 1, 1 designates an engine body, 2 an intake manifold, 3 a collecting portion of the intake manifold 2, and 4 a heat insulating plate; 5 designates a carburetor fixed onto the intake manifold 2 via the heat insulating plate 4. The carburetor 5 comprises a primary carburetor A having a vertically extending primary air horn 6 and a primary throttle valve 7, and a secondary carburetor B having a vertically extending secondary air horn 8 and a secondary throttle valve 9. As illustrated in FIGS. 1 and 2, a hollow cylindrical heater vessel 10, having an inner diameter which is almost the same as that of the primary air horn 6, is arranged in the heat insulating plate 4 located beneath the primary carburetor A so that the lower portion of the heater vessel 10 projects into the collecting portion 3 of the intake manifold 2. As illustrated in FIGS. 2 and 3, the heater vessel 10 comprises an inner pipe 11 and an outer pipe 12. The inner pipe 11 has a thin wall and is made of a material, such as an aluminum alloy, having a high thermal conductivity. The outer pipe 12 has a relatively thick wall and is made of a heat insulating material. The inner pipe 11 has on its upper end a horizontally outwardly extending upper flange 13 formed in one piece thereon, and the outer pipe 12 has on its upper end a horizontally outwardly extending upper flange 14 formed in one piece thereon. In addition, the outer pipe 12 has on its lower end a horizontally inwardly extending lower flange 15 formed in one piece thereon. A cylindrical PTC element 16, having a thin wall, is inserted between the inner pipe 11 and the outer pipe 12, so that the inner wall of the PTC element 16 comes firmly into contact with the outer wall of the inner pipe 11. Consequently, the inner wall of the PTC element 16 is electrically connected to the inner pipe 11. In addition, a resilient ring 17 is connected onto the outer wall of the PTC element 16 and, thus, the outer wall of the PTC element 16 is electrically connected to the resilient ring 17. The heater vessel 10 illustrated in FIG. 2 is formed in such a way that, after the PTC element 16 is fitted onto the inner pipe 16, the resilient ring 17 is fitted onto the PTC element 16 and, then, a synthetic resin layer, forming the outer pipe 12, is formed around the outer wall of the PTC element 16.

As illustrated in FIG. 2, the intake manifold 2 has a hole 18 having an inner diameter which is almost the same as the outer diameter of the outer pipe 12, and the heater vessel 10 is inserted into the hole 18. In addition, the heat insulating plate 4 has on its lower end an increased diameter portion 19, arranged adjacent to the hole 18 and the upper flanges 13 and 14 are inserted into the increased diameter portion 19. As illustrated in FIG. 2, the resilient ring 17 is connected to the intake manifold 2 via a lead 20. In addition, one end of the lead 21 is connected to the inner pipe 11 and, as illustrated in FIG. 1, the other end of the lead 21 is connected to a power source 25 via a temperature reactive switch 22, a voltage reactive switch 23 and an ignition switch 24. The temperature reactive switch 22 is in the ON position when the temperature of the cooling water of the engine is lower than, for example, 60° C., while the temperature reactive switch 22 is turned to the OFF position when the temperature of the cooling water of the engine exceeds 60° C. The voltage reactive switch 23 is in the OFF position when the voltage, produced at the neutral point of the alternator (not shown) driven by the engine, is lower than a predetermined level, while the voltage reaction switch 23 is turned to the ON position when the voltage, produced at the neutral point of the alternator, is increased beyond the predetermined level.

As is known to those skilled in the art, a large amount of electric current flows within the PTC element 16 when the supply of the electric current is started. Consequently, during the time the starter motor (not shown) is operated for starting the engine, it is necessary that the supply of the electric current not be fed into the PTC element 16. To this end, the voltage reactive switch 23 is provided. That is, when the engine is compulsorily rotated by the starter motor, the voltage, produced at the neutral point of the alternator, is very low. On the other hand, when the engine begins to rotate under its own power, the voltage, produced at the neutral point of the alternator, is increased. As a result of this, the voltage reactive switch 23 is turned to the ON position and, thus, an electric current begins to be fed into the PTC element 16. When the feed of the electric current is started, as mentioned above, the temperature of the PTC element 16 is instantaneously increased and, as a result, the temperature of the inner pipe 11 is instantaneously increased.

When the engine is started, a large part of the fuel fed from the primary carburetor A flows downward on the inner wall of the primary air horn 6 in the form of liquid fuel and then flows downward on the inner wall of the inner pipe 11 of the heater vessel 10. Consequently, the liquid fuel, flowing downward on the inner wall of the inner pipe 11, is heated by the inner pipe 11 and, thus, vaporization of the liquid fuel is promoted. As illustrated in FIG. 2, the PTC element 16 is surrounded by the outer pipe 15 made of a heat insulating material. Therefore, only an extremely small part of the heat issued from the PTC element 16 escapes to the intake manifold 2. Consequently, a large part of the heat issued from the PTC element 16 is used for heating the inner pipe 11. In addition, the inner wall of the inner pipe 11 is covered by the liquid fuel and, thus, a large part of the heat issued from the PTC element 16 is used for promoting the vaporization of the liquid fuel.

When the temperature of the cooling water of the engine exceeds 60° C. a little while after the engine is started, the temperature reactive switch 22 is turned to the OFF position and, as a result, the supply of the electric current fed into the PTC element 16 is stopped.

Figure 4:
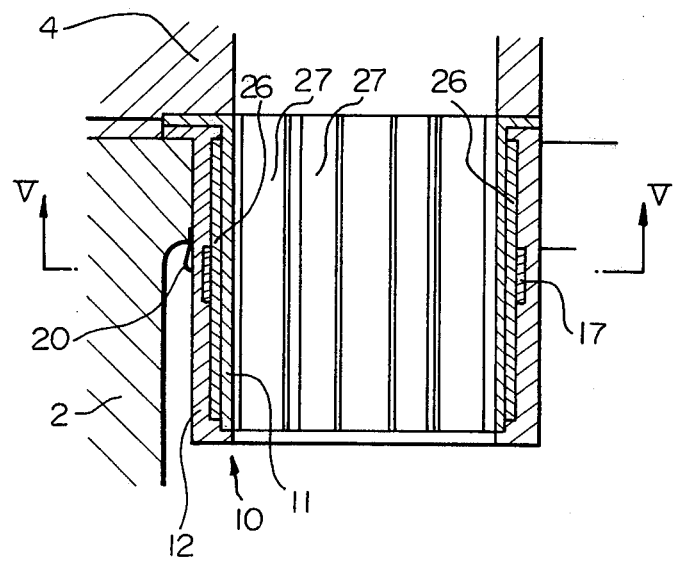
FIG. 4 is a cross-sectional side view of another embodiment according to the present invention, taken along the line IV—IV in FIG. 5.
Figure 5:
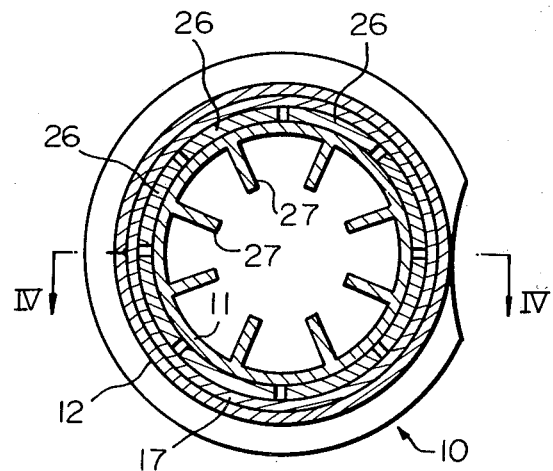
FIG. 5 is a cross-sectional view taken along the line V—V in FIG. 4.

The PTC element 16 is made of a ceramic material and can be easily shaped in the form of a hollow cylindrical shape having a thin wall. However, it is difficult to form the PTC element 16 so that the corss-section thereof becomes precisely equal to a circle and, therefore, there is a possibility the inner wall of the PTC element 16 does not completely contact the outer wall of the inner pipe 11. Consequently, in order to obtain complete contact between the inner wall of the PTC element 16 and the outer wall of the inner pipe 11, it is preferable that the PTC element 16 be divided into more than two pieces. FIGS. 4 and 5 illustrate another embodiment in which the PTC element is divided into a plurality of pieces. Referring to FIGS. 4 and 5, a plurality of PTC element pieces 26, each being shaped in the form of a hollow cylindrical body, is inserted between the inner pipe 11 and the outer pipe 12, and the PTC element pieces 26 are urged onto the outer wall of the inner pipe 11 due to the resilient force of the resilient ring 17. By using a plurality of the PTC element pieces 26, since the contacting area between the outer wall of the inner pipe 11 and the inner walls of the PTC element pieces 26 is increased, it is possible to improve the thermal conductivity between the inner pipe 11 and the PTC element pieces 26. In addition, in this embodiment, a plurality of vertically extending fins 27 are formed in one piece on the inner wall of the inner pipe 11 for promoting the vaporization of fuel droplets floating in the mixture and for improving the efficiency of the thermal conductivity by increasing the area of the thermal conductive surface.

According to the present invention, since a large part of the heat issued from the PTC element is used for heating liquid fuel, it is possible to fully promote the vaporization of the liquid fuel. Consequently, even if a fuel mixture, which is leaner than that used in a prior art, is used before the completion of warm-up of the engine, good combustion can be obtained and, thus, a stable operation of the engine can be ensured. In addition, since it is possible to use such a leaner mixture before the completion of warm-up of the engine, the amount of harmful components can be reduced, and specific fuel consumption can be reduced.

While the invention has been described by reference to specific embodiments chosen for purposes of illustration, it should be apparent that numerous modifications could be made thereto by those skilled in the art without departing from the basic concept and scope of the invention.

We claim:

1. A fuel mixture heating device of an internal combustion engine having an intake manifold and an intake passage which has an outlet connected to a collecting portion of the intake manifold, the intake passage having a fuel feed apparatus for feeding fuel into the intake passage, said device comprising:
 a power source, and
 a hollow cylindrical heater vessel arranged at the outlet of the intake passage and having an outlet portion which projects into the collecting portion of the intake manifold, said heater vessel comprising a hollow cylindrical inner pipe, a hollow cylindrical outer pipe made of a heat insulating material, and a heater element connected to said power source, said heater element being between said inner pipe and said outer pipe and directly contacting both said inner pipe and said outer pipe, said inner pipe being aligned with the intake passage and having a uniform inner diameter throughout its length which is substantially the same as that of the intake passage whereby the inner pipe transmits heat to the fuel mixture in order to vaporize it and acts as an electrode, while the outer pipe acts as a heat insulator.

2. A fuel mixture heating device as claimed in claim 1, wherein said heater element comprises a PTC element having an inner wall which is in contact with an outer wall of said inner pipe, said heater vessel further comprising a resilient ring connected onto the outer wall of said PTC element for electrically connecting the outer wall of said inner pipe to said resilient ring.

3. A fuel mixture heating device as claimed in claim 2, wherein said PTC element has a hollow cylindrical shape having a thin wall.

4. A fuel mixture heating device as claimed in claim 2, wherein said PTC element comprises a plurality of pieces, each being shaped in the form of a portion of a hollow cylindrical body.

5. A fuel mixture heating device as claimed in claim 1, wherein the collecting portion of the intake manifold has a hole into which said heater vessel is inserted.

6. A fuel mixture heating device as claimed in claim 1, wherein said device comprises a heat insulating plate having a hole and is inserted between the intake passage and the collecting portion of the intake manifold, said heater vessel having an outwardly extending flange portion at an inlet portion thereof, which is located opposite to the outlet portion of said heater vessel, the hole of said heat insulating plate having an increased diameter portion into which the flange portion of said heater vessel is inserted.

7. A fuel mixture heating device as claimed in claim 1, wherein said inner pipe has an end face at said outlet portion, and said outer pipe has at said outlet portion an inwardly extending flange which is in engagement with the end face of said inner pipe.

8. A fuel mixture heating device as claimed in claim 1, wherein said heat vessel has a plurality of axially extending fins formed in one piece thereon.

9. A fuel mixture heating device as claimed in claim 1, wherein said device further comprises a first switch which is in the ON position when the temperature of the engine is lower than a predetermined temperature, and a second switch which is in the ON position when the engine is operating under its own power, said heater element being connected to said power source via said first switch and said second switch.

10. A fuel mixture heating device as claimed in claim 9, wherein said second switch is operated in response to a change in voltage produced at a neutral point of an alternator which is driven by the engine.

* * * * *